(12) United States Patent
Kurkoski et al.

(10) Patent No.: US 7,573,026 B2
(45) Date of Patent: Aug. 11, 2009

(54) PILEUP REJECTION

(75) Inventors: Philip L. Kurkoski, Houston, TX (US); Tuan V. Nguyen, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/763,153

(22) Filed: Jun. 14, 2007

(65) Prior Publication Data

US 2007/0290126 A1 Dec. 20, 2007

Related U.S. Application Data

(60) Provisional application No. 60/813,736, filed on Jun. 14, 2006.

(51) Int. Cl.
*G01V 5/10* (2006.01)
(52) U.S. Cl. .................................................. 250/262
(58) Field of Classification Search ................. 250/262, 250/256, 261, 269.6, 269.7
See application file for complete search history.

(56) References Cited

U.S. PATENT DOCUMENTS

| | | | | |
|---|---|---|---|---|
| 3,609,366 A | * | 9/1971 | Schwartz | 250/262 |
| 3,796,877 A | * | 3/1974 | Smith, Jr. | 376/162 |
| 3,886,355 A | * | 5/1975 | Culver | 376/163 |
| 3,946,226 A | * | 3/1976 | Smith, Jr. | 250/256 |
| 4,020,342 A | * | 4/1977 | Smith et al. | 250/269.8 |
| 4,152,596 A | | 5/1979 | Marshall, III | 250/358 R |
| 4,381,449 A | * | 4/1983 | Smith, Jr. | 250/269.8 |
| 4,454,420 A | * | 6/1984 | Smith, Jr. | 250/269.8 |
| 4,593,198 A | | 6/1986 | Pang et al. | 250/366 |
| 4,596,927 A | * | 6/1986 | Hopkinson et al. | 250/269.8 |
| 4,629,894 A | * | 12/1986 | Lelong | 250/363.02 |
| 4,835,707 A | | 5/1989 | Amano et al. | 364/497 |
| 5,132,540 A | * | 7/1992 | Adolph et al. | 250/369 |
| 5,210,423 A | * | 5/1993 | Arseneau | 250/369 |
| 5,225,682 A | | 7/1993 | Britton, Jr. et al. | 250/395 |
| 5,635,711 A | * | 6/1997 | Sloan et al. | 250/254 |
| 5,884,234 A | * | 3/1999 | Jorion et al. | 702/66 |
| 6,215,122 B1 | | 4/2001 | Clifford et al. | 250/369 |
| 6,291,825 B1 | | 9/2001 | Scharf et al. | 250/369 |
| 6,310,349 B1 | * | 10/2001 | Wong et al. | 250/363.09 |
| 6,470,285 B1 | | 10/2002 | Atwell | 702/66 |
| 6,525,322 B2 | * | 2/2003 | Wong et al. | 250/363.09 |
| 6,584,837 B2 | | 7/2003 | Kurkoski | 73/152.02 |
| 6,769,497 B2 | | 8/2004 | Dubinsky et al. | 175/27 |
| 6,901,337 B2 | * | 5/2005 | Tanaka et al. | 702/60 |
| 6,936,822 B2 | * | 8/2005 | Wong et al. | 250/363.09 |
| 7,139,350 B2 | * | 11/2006 | Tiller et al. | 376/160 |
| 7,439,515 B2 | * | 10/2008 | Bak | 250/369 |

FOREIGN PATENT DOCUMENTS

EP 0511665 B1 7/1992

* cited by examiner

*Primary Examiner*—David P Porta
*Assistant Examiner*—David S Baker
(74) *Attorney, Agent, or Firm*—Madan & Sriram, P.C.

(57) ABSTRACT

A correction for pileup of measurements made by a nuclear detector is applied by selecting the energy of the first signal in a pileup, ignoring the remaining signals in the pileup, and correcting the count rate by a factor related to the total pulse widths within a unit time interval. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

19 Claims, 8 Drawing Sheets

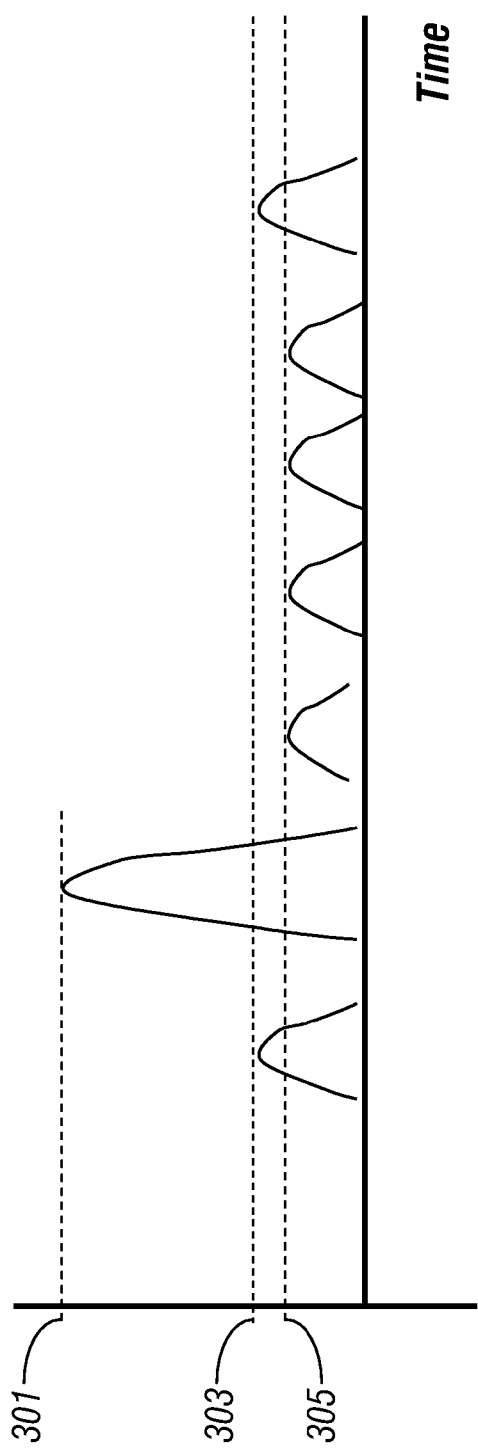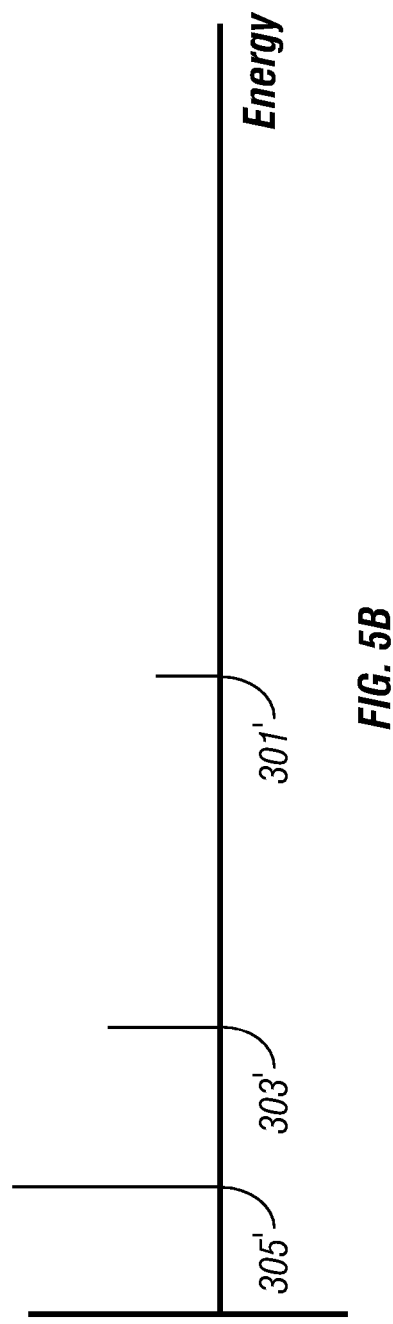
FIG. 5A
FIG. 5B

PILEUP REJECTION

CROSS-REFERENCES TO RELATED APPLICATIONS

This application claims priority from U.S. provisional patent application Ser. No. 60/813,736 filed on Jun. 14, 2006.

FIELD OF THE INVENTION

This invention relates generally methods processing logging-while-drilling (LWD) measurements. More particularly, this invention relates to improving the accuracy and resolution made with nuclear logging instruments.

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A sonde for borehole applications usually transmits energy into the formation as well as a suitable receiver for detecting the same energy returning from the formation. These could include resistivity, acoustic, or nuclear measurements. The present invention is discussed with reference to a density measurement tool that emits nuclear energy, and more particularly gamma rays, but the method of the present invention is applicable to other types of logging instruments as well. Gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

By obtaining the gamma ray spectrum of the received gamma rays, it is possible to infer something about the formation properties, such as density. The objective is to sort each pulse according to its amplitude. Every pulse from a linear amplifier is sorted into one of a large number of bins or channels. Each channel corresponds to signal pulses of a specific narrow amplitude range. As the pulses are sorted into the channels matching their amplitude, a pulse-height spectrum is accumulated. In this spectrum, peaks correspond to those pulse amplitudes around which many events occur. Because pulse amplitude is related to deposited energy, such peaks often correspond to radiation of a fixed energy recorded by the detector. By noting the position and intensity of peaks recorded in the pulse-height spectrum, it is often possible to interpret spectroscopy measurements in terms of the energy and intensity of the incident radiation. Additionally, the total count rate within a band of energy levels is indicative of the formation porosity.

Ideally when the measurement is completed the sum of all the counts that have been recorded in the channels equals the total number of pulses produced by the detector over the measurement period. In order to maintain this correspondence at high counting rates corrections must be applied to account for the dead time of the recording system and/or the pileup of two (overlapping) pulses spaced so closely in time that they appear to be only one pulse to the multichannel analyzer. The present invention addresses this problem.

SUMMARY OF THE INVENTION

One embodiment of the invention is a method of evaluating an earth formation. Radiation measurements indicative of a property of the earth formation are obtained using a logging tool conveyed in a borehole. The measurements include at least one pileup signal of at least two pulses. A peak of the first one of the two pulses is detected and the value of the peak is used for determining the property of the earth formation. The radiation measurements may be gamma ray measurements. There may be more than one pileup signal. A peak of the second pulse of a pileup may be disregarded. A waveform corresponding to the first of the two pulses may be subtracted from the pileup signal. The determination of the property may be based on deconvolving the at least one pileup signal. The determination of the property may be done using the value of the first peak to produce a count rate spectrum. The property may be the formation density. A baseline correction may be applied to the measurements. There may be more than one pileup signal.

Another embodiment of the invention is an apparatus for evaluating an earth formation. The apparatus includes a radiation source on a logging tool that is conveyed into a borehole. The radiation source irradiates the formation. A radiation detector on the logging tool obtains radiation measurements resulting from the radiation. The measurements include at least one pileup signal of at least two pulses. A processor detects a peak of the first of the two pulses and uses a value of the peak for determining a property of the formation. The radiation detector may be a gamma ray detector. There may be more than one pileup signal. The processor may disregard a peak of the second of the two pulses. The processor may subtract a waveform corresponding to the first of the two pulses from the pileup signal. The processor may determine the formation property by deconvolving the pileup signal. The processor may determine the formation property by using the value of the peak to produce a count rate spectrum. The property determined by the processor may be density. The processor may apply a baseline correction to the measurements. The apparatus may include a wireline, drilling tubular or a slickline for conveying the logging tool into the borehole.

Another embodiment of the invention is a computer-readable medium for use with an apparatus for evaluating an earth formation. The apparatus includes a radiation source on a logging tool conveyed in a borehole. The radiation source irradiates the formation. A radiation detector on the logging tool obtains radiation measurements resulting from the irradiation. The measurements include at least one pileup signal of at least two pulses. The medium includes instructions which enable a processor to detect a peak of the first of the two pulses and use the value of the peak for determining a property of the earth formation. The medium may include a ROM, an EPROM, an EAROM, a flash memory, and an optical disk.

BRIEF DESCRIPTION OF THE FIGURES

The present invention and its advantages will be better understood by referring to the following detailed description and the attached drawings in which:

FIGS. 5A and 5B illustrate the processing of pulse signals to a histogram of energy counts;

DETAILED DESCRIPTION OF THE INVENTION

Figure 1:
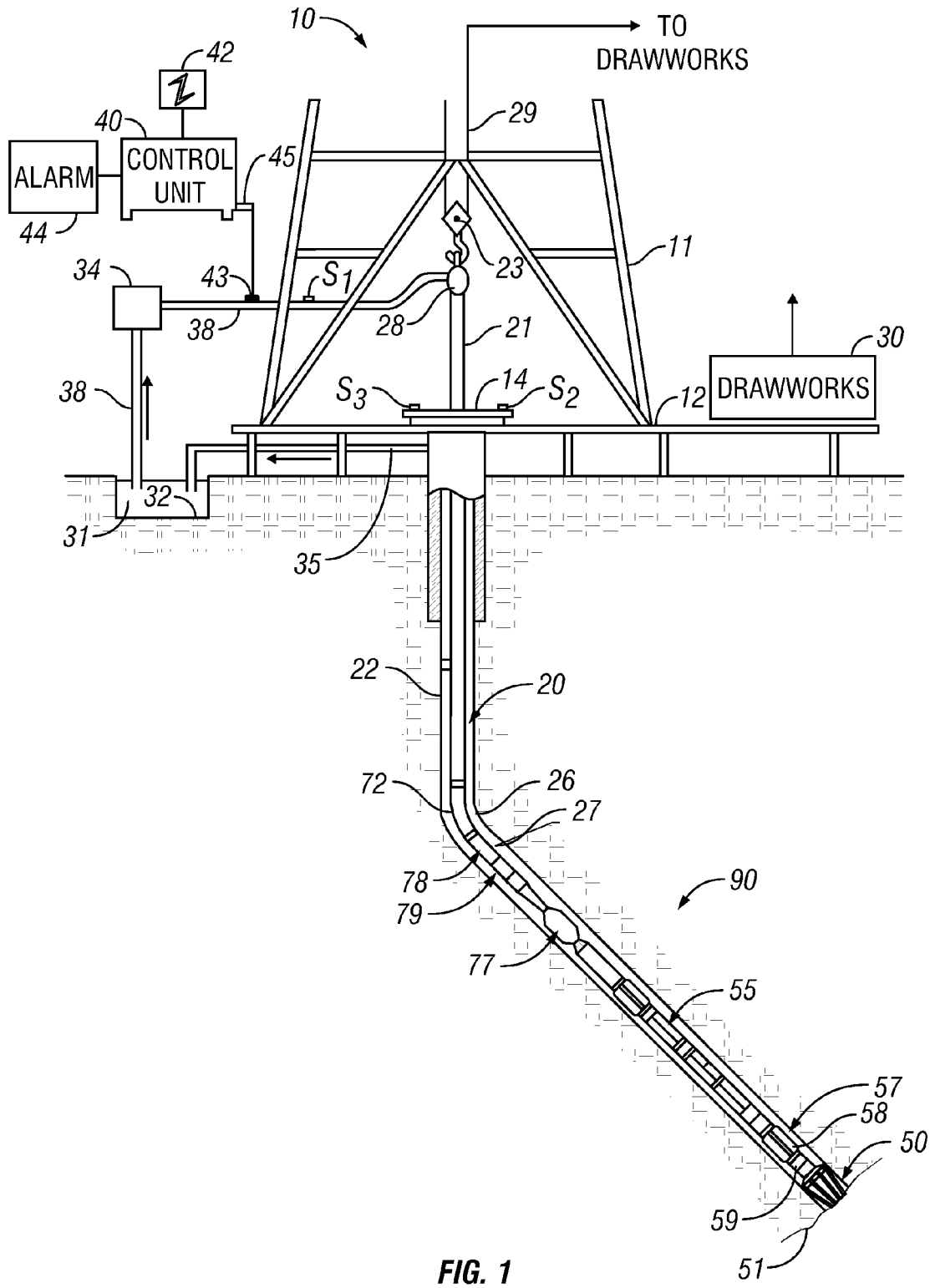
FIG. 1 (prior art) shows a schematic diagram of a drilling system having a drill string that includes an apparatus according to the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein. For the purposes of this invention, it is necessary to know the axial velocity (rate of penetration or ROP) of the bottomhole assembly. Depth information and ROP may be communicated downhole from a surface location. Alternatively, the method disclosed in U.S. Pat. No. 6,769,497 to Dubinsky et al. having the same assignee as the present application and the contents of which are incorporated herein by reference may be used. The method of Dubinsky uses axial accelerometers to determine the ROP. During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor S2 and a sensor S3 associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
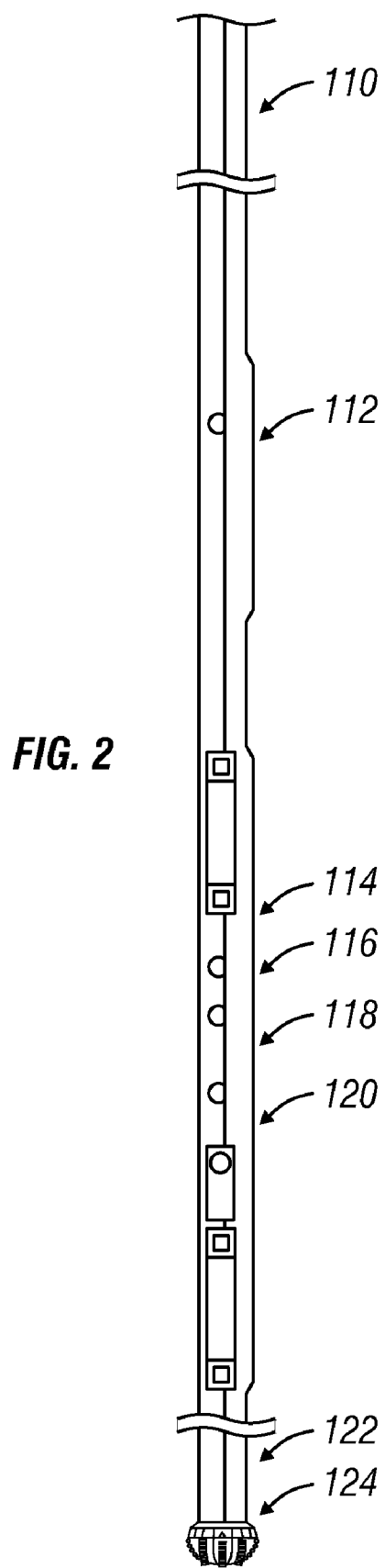
FIG. 2 shows the components of a gamma ray logging tool used for measurements while drilling.

FIG. 2 illustrates the arrangement of the nuclear sensors on a logging-while-drilling device. FIG. 2 is a diagram of the basic components for an exemplary gamma-ray density tool used for evaluating an earth formation. This tool comprises an upper section of a bottom hole assembly including a drill collar 110. The logging tool of the present invention contains a gamma-ray source 114 and two spaced gamma-ray detector assemblies 116 and 118. All three components are placed along a single axis that has been located parallel to the axis of the tool. The detector 116 closest to the gamma-ray source will be referred to as the "short space detector" and the one farthest away 118 is referred to as the "long space detector". Gamma-ray shielding (not shown) is located between detector assemblies 116, 118 and source 114. Windows (ports) open up to the formation from both the detector assemblies and the source. An acoustic caliper 120 may be inline and close to the gamma detectors (LS & SS). A layer of drilling fluid (mud) is present between the formation and the detector assemblies and source. Also shown in FIG. 2 are the lower section of the bottomhole assembly 122 and drill bit 124 and the logging-while-drilling device may contain one or more additional sensor assemblies with additional carrier sections 112. The source 114 irradiates the formation with gamma-ray radiation. The detectors obtain radiation measurements resulting from the irradiation.

Figure 3:
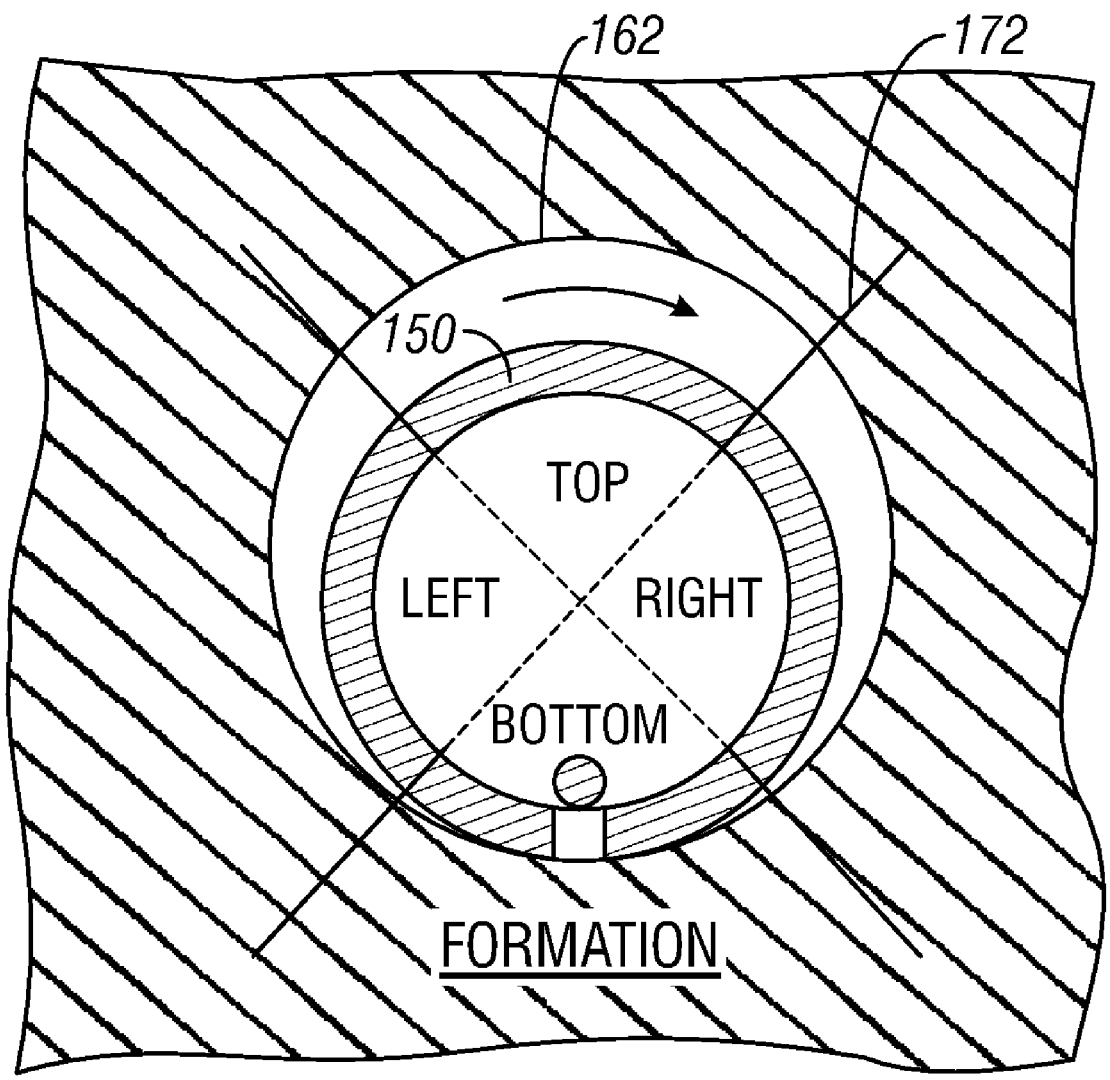
FIG. 3 shows an idealized situation in which a rotating tool in a wellbore has a minimum standoff when the tool is at the bottom of the wellbore.

Turning now to FIG. 3, the logging tool 150 is shown in a typical position in a deviated borehole 162. The term "deviated" means that the axis of the borehole is inclined to the vertical. Depending upon the context, the vertical may be an absolute vertical defined by gravity, or in some cases, may be defined by the vertical to bedding planes of the formation. For the example shown in FIG. 3, the borehole is inclined to the gravity vertical and hence will commonly take up a position at or near the bottom of the borehole. Four quadrants may be defined as "top", "right", "bottom" and "left." The use of four quadrants is for exemplary purposed only, and in reality, measurements made by the logging tool during rotation may be binned into more than four sectors. As discussed in U.S. Pat. No. 6,584,837 to Kurkoski having the same assignee as the present invention and the contents of which are incorporated herein by reference, the measurements made during rotation may be binned by sector as well as by standoff (as measured by the caliper). Fundamental to the method of Kurkoski or any other method of analyzing measurements made by a nuclear sensor is the nature of the measurements themselves.

Figure 4A:
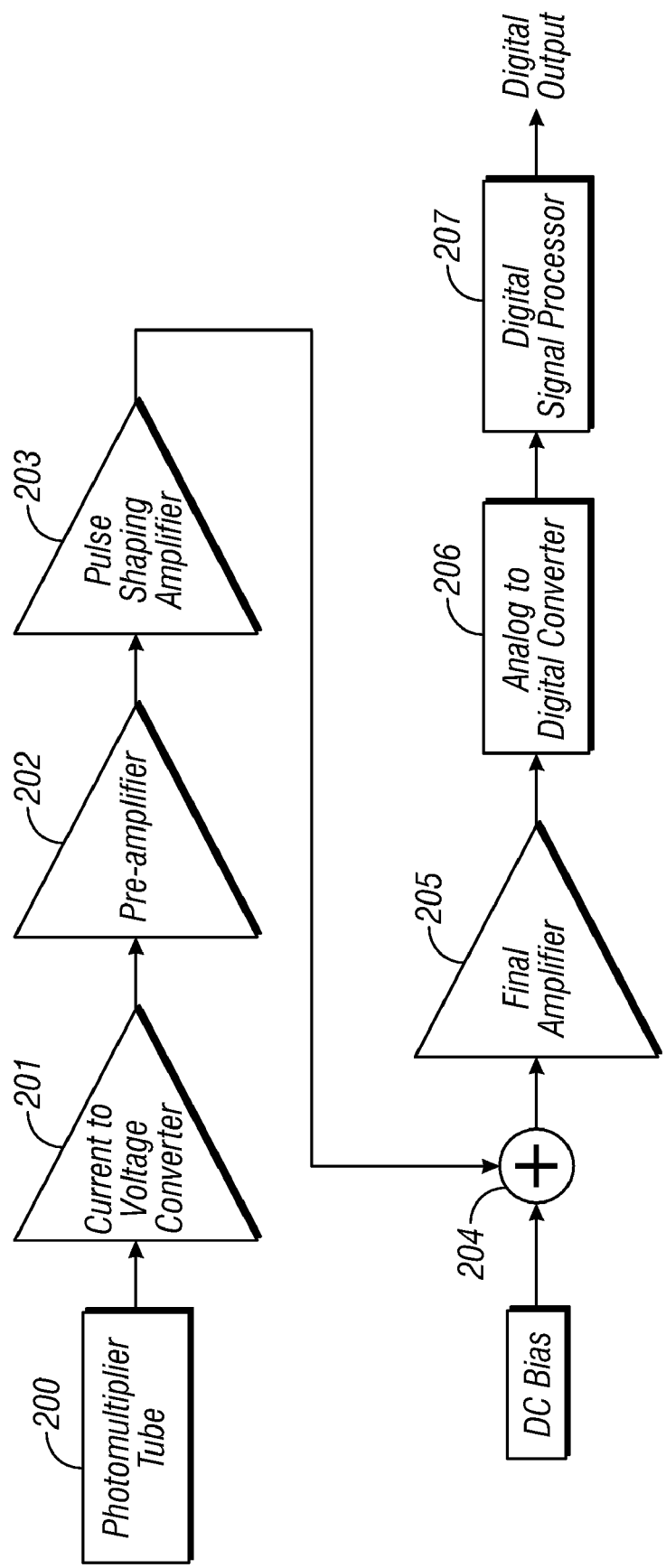
FIG. 4A is a schematic diagram of the pre-processing of the output of an exemplary detector.
Figure 4B:
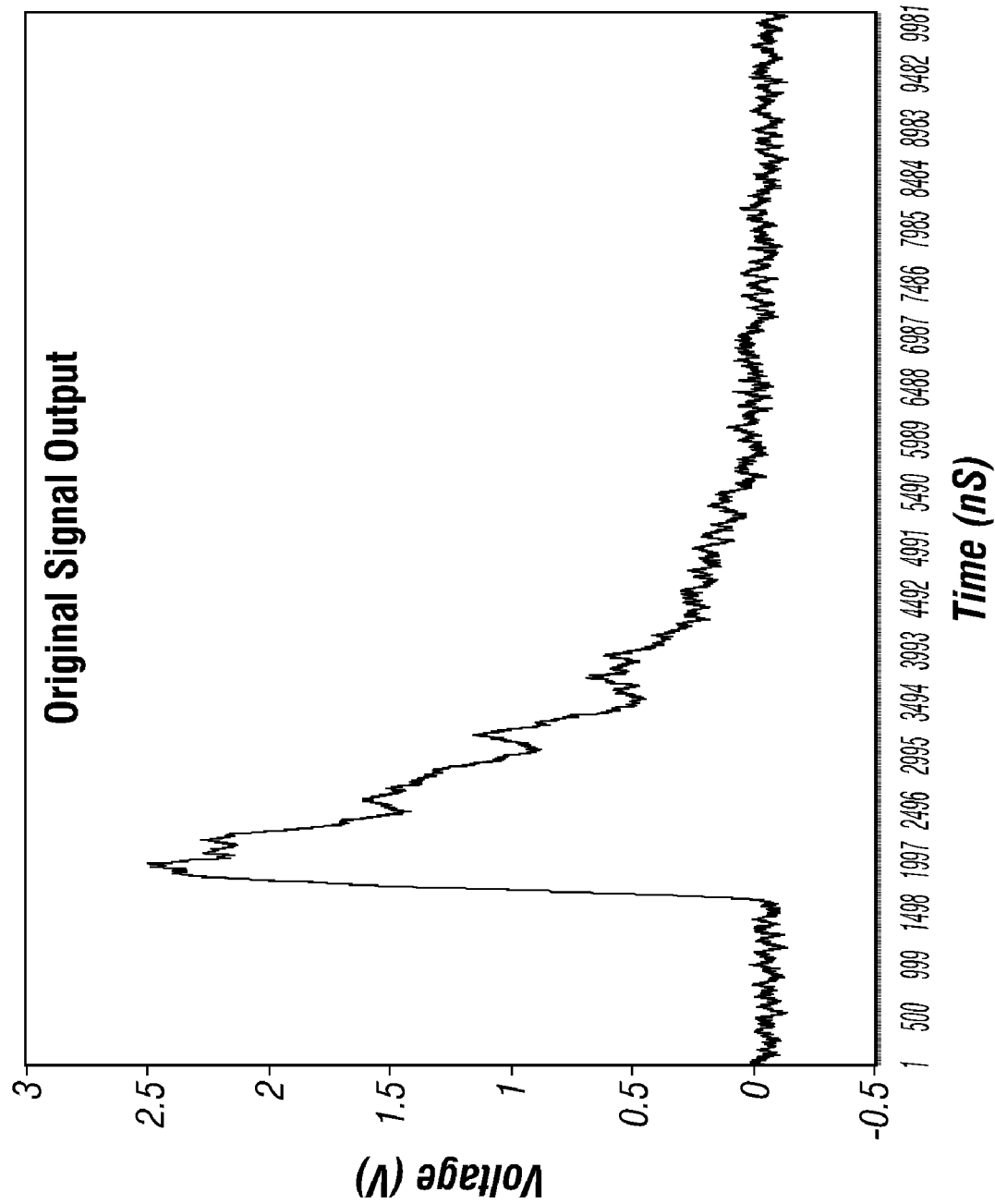
FIGS. 4B and 4C show exemplary signals at different steps of the preprocessing.
Figure 4C:
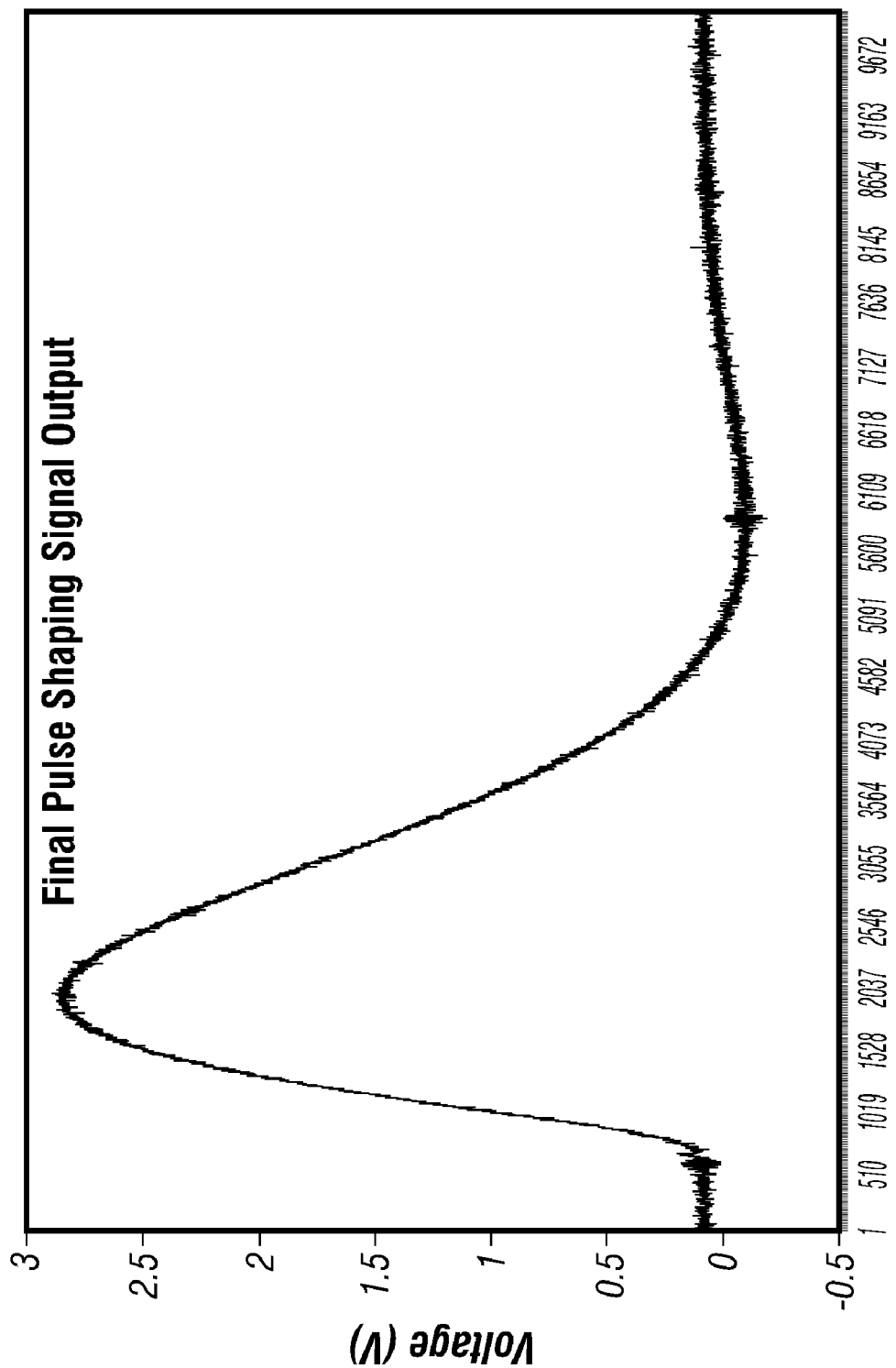

In one embodiment of the invention, the detectors 114, 116 may be NaI detectors, though this is not to be construed as a limitation of the invention. Turning to FIG. 4A, the output of the detector 200 is a current pulse and is converted to a voltage pulse by the current to voltage converter amplifier 201. Shown in FIG. 4B is the waveform output of the preamplifier 202. The output have very sharp rise time and narrow pulse width, thus it is necessary to pulse shaping this signal before it can be further process. This pulse is being filter and pulse shape by the Pulse Shaping Amplifier 203. The analog to digital converter (ADC) 206 is unipolar which means it cannot process any signal that is below ground reference. Therefore, a DC bias level is added to the signal 204. A final amplifier stage is to amplify the signal to the correct amplitude correspond to the energy level output by the detector for further processing 205. The output of the final amplifier stage is shown in FIG. 4C. This output signal is then converted to digital format by the ADC 206 and then further processed by the Digital Signal Processor (DSP) 207.

One of the operations that is carried out by the DSP is the processing of the raw data (which consists of a time series of a plurality of "events" that have associated amplitudes to a "count rate" spectrum as a function of energy level. This is depicted schematically in FIG. 5A where there is a single pulse (or event) with an amplitude of 301, two events with an amplitude of 303 and 5 events with an amplitude of 305. The resulting count rate is shown in FIG. 5B where the counts of events having amplitudes 301, 303 and 305 are depicted by 301', 303' and 305'. The plot of FIG. 5b is a histogram of the number of events (ordinate) plotted as a function of energy level (abscissa), the energy level being related to the amplitudes of the output the signal detector 200.

Figure 6:
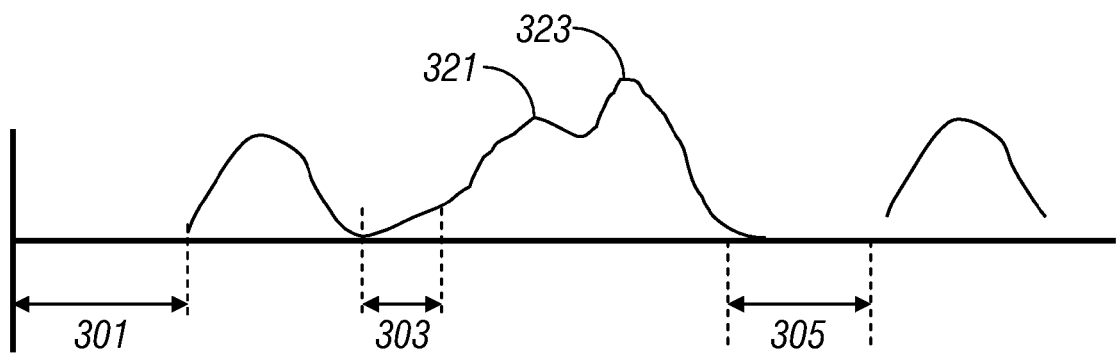
FIG. 6 shows an example of pileup.

One of the problems that commonly occurs is that of "pileup." This is illustrated in FIG. 6 when there are two pulses 321, 323 wherein the second pulse 323 arrives before the first pulse 321 has decayed to zero. In the example shown, the resulting peak of the second pulse 323 is higher than the peak of the first pulse. Prior art methods have attempted to treat this problem by ignoring the first peak and only using the magnitude of the second peak 323. This results in a bias in the energy count distribution such as that of FIG. 5B for reasons discussed next with reference to FIG. 7.

Figure 7:
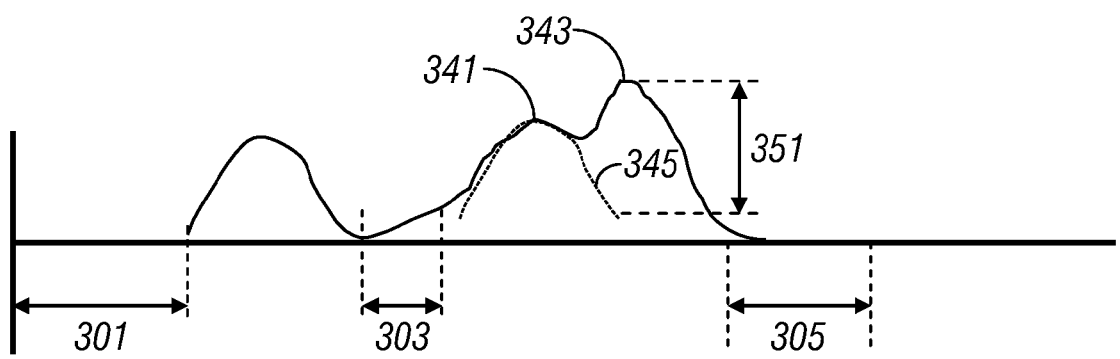
FIG. 7 illustrates methods by which the effect of pileup can be corrected.

Shown in FIG. 7 are the same two overlapping pulses, shown here as 341 and 343. Also shown in FIG. 7 is the tail end of the first pulses. The tail end is denoted by 345. Visual inspection of FIG. 7 shows that for the example shown, the peak value of the second pulse is denoted by 351, the difference between the peak 343 and the tail end of 345 at the peak. This is clearly seen to be less than the magnitude of the peak 343. Thus, the signal level is overestimated which, in turn, skews the histogram of FIG. 5B to the right. This skewing of energy levels to higher values is interpreted as resulting from more hydrogen nuclei in the pore space of the formation, i.e., a higher porosity and an underestimation of density.

In the present invention, there are two ways of correcting for this underestimation of density. In one embodiment of the invention, the first peak is detected where there is a pileup and the second and later peaks are ignored. Detection of the peak is done by using a peak-finding technique. The time intervals such as 301, 303, 305, when there is no signal are added up to give a total time DT within a one second interval. The measured count-rate CR is then adjusted by dividing it by DT. This is the same as dividing the measured count-rate by (one minus the accumulated pulse widths) within a one second interval. As would be recognized by those versed in the art, selecting the first peak has the result of skewing the count rate histogram to the left, and this division corrects for it by increasing the count rate.

In an alternate embodiment of the invention, the actual recorded signal is deconvolved by a known reference wavelet such as 222 that characterizes the response of the system to a single isolated event. When such a deconvolution filter is applied to a signal such as that shown in FIG. 7, the individual pulses will be resolved and can be detected. This deconvolution is equivalent to a procedure in which the tail end of an earlier pulse is subtracted before picking a peak value for a later pulse.

One aspect of the invention that is used with either of the two embodiments of the invention discussed above is that of base-line correction. This base-line correction may be done by averaging the recorded signals over time intervals in which no signal is detected. The spectrum is then defined using the value of the peak relative to this baseline.

As would be known to those versed in the art, each pileup signal may include more than two pulses. In addition, there may be more than one pileup signal. The process count rate spectrum may then be used to determine the density of the formation and the density may be recorded on a suitable medium. This may be in the form of a log of the density and the values may be recorded digitally on a recording medium.

The processing of the data may be accomplished uphole after the data have been retrieved from the NMR tool's memory, or may be accomplished by a downhole processor. In the latter case the averaged velocity must be available downhole, e.g., the averaged velocity may be obtained uphole and transmitted downhole by a suitable method of telemetry. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a property of an earth formation, the method comprising:
   obtaining radiation measurements indicative of the property of the formation using a logging tool conveyed in a borehole, the measurements comprising at least one pileup signal of at least two overlapping pulses;
   detecting a peak of a first one of the at least two pulses;
   using a value of a magnitude of the peak for determining the property of the earth formation; and
   recording the property on a suitable medium.

2. The method of claim 1 wherein the radiation measurements comprise gamma ray measurements.

3. The method of claim 1 wherein the at least one pileup signal comprises a plurality of pileup signals.

4. The method of claim 1 further comprising disregarding a peak of a second of the at least two pulses.

5. The method of claim 1 further comprising subtracting a waveform corresponding to a first one of the at least two pulses from the at least one pileup signal.

6. The method of claim 1 wherein determining the property of the earth formation further comprises using the value of the magnitude of the peak to produce a count rate spectrum.

7. The method of claim 1 wherein the property comprises a density of the formation.

8. The method of claim 1 further comprising applying a baseline correction to the measurements.

9. An apparatus configured to determine a property of an earth formation, the apparatus comprising:
   a radiation source on a logging tool configured to be conveyed in a borehole and irradiate the formation;
   a radiation detector on the logging tool configured to obtain radiation measurements resulting from the irradiation, the measurements comprising at least one pileup signal of at least two pulses; and
   a processor configured to:
   (A) detect a peak of a first one of the at least two pulses;
   (B) use a value of a magnitude of the peak for determining a property of the earth formation; and
   (C) record the property on a suitable medium.

10. The apparatus of claim 9 wherein the radiation detector comprises a gamma ray detector.

11. The apparatus of claim 9 wherein the at least one pileup signal comprises a plurality of pileup signals.

12. The apparatus of claim 9 wherein the processor is further configured to disregard a peak of the second of the at least two pulses.

13. The apparatus of claim 9 wherein the processor is further configured to subtract a waveform corresponding to a first one of the at least two pulses from the at least one pileup signal.

14. The apparatus of claim 9 wherein the processor is configured to determine the property of the earth formation by using the value of the magnitude of the at least one peak to produce a count rate spectrum.

15. The apparatus of claim 9 wherein the property determined by the processor comprises a density of the formation.

16. The apparatus of claim 9 wherein the processor is configured to use the value of the peak by further applying a baseline correction to the measurements.

17. The apparatus of claim 9 further comprising a conveyance device configured to convey a logging tool into the borehole, the conveyance device selected from (i) a wireline, (ii) a drilling tubular and (iii) a slickline.

18. A computer readable medium accessible to a processor, the computer-readable medium including instructions which enable the processor to:
   detect a peak of a first one of at least two pulses forming a pileup signal measured by a radiation detector on a logging tool responsive to irradiation of an earth formation by a source of radiation on the logging tool;
   use a value of the magnitude of the peak for determining a property of the earth formation; and
   record the property on a suitable medium.

19. The computer readable medium of claim 18 further comprising at least one of (i) a ROM, (ii) an EPROM, (iii) an EAROM, (iv) a flash memory, and (v) an optical disk.

* * * * *

UNITED STATES PATENT AND TRADEMARK OFFICE
CERTIFICATE OF CORRECTION

PATENT NO. : 7,573,026 B2 Page 1 of 1
APPLICATION NO. : 11/763153
DATED : August 11, 2009
INVENTOR(S) : Philip L. Kurkoski and Tuan V. Nguyen It is certified that error appears in the above-identified patent and that said Letters Patent is hereby corrected as shown below:

Column 8, claim 12, line 19, delete "peak of the", insert --peak of a--;

Column 8, claim 13, line 22, delete "corresponding to a", insert --corresponding to the--; and Column 8, claim 18, line 45, delete "the magnitude", insert --a magnitude--.

Signed and Sealed this

Twenty-fourth Day of November, 2009

David J. Kappos
*Director of the United States Patent and Trademark Office*